United States Patent [19]

Ishihara et al.

[11] 4,268,136
[45] May 19, 1981

[54] CAMERA HAVING AN AUTOMATIC EXPOSURE CONTROL MEANS

[75] Inventors: Haruji Ishihara, Kodaira; Ryushi Shimokawa, Fuchu; Michio Yagi, Hachioji; Kazuo Shiozawa, Hino; Kijiro Suzuki, Tokyo; Kazuhisa Aratame, Hachioji, all of Japan

[73] Assignees: Konishiroku Photo Industry Co., Ltd.; Hitachi, Ltd., both of Tokyo, Japan

[21] Appl. No.: 924,009

[22] Filed: Jul. 12, 1978

[30] Foreign Application Priority Data

Jul. 18, 1977 [JP] Japan .................................. 52-85076

[51] Int. Cl.³ .............................................. G03B 7/091
[52] U.S. Cl. ................................................ 354/23 D
[58] Field of Search ........................... 354/23 D, 60 A

[56] References Cited

U.S. PATENT DOCUMENTS

| 4,075,638 | 2/1978 | Strauss et al. | 354/23 D |
| 4,081,805 | 3/1978 | Takahashi | 354/23 D |
| 4,106,033 | 8/1978 | Nakamoto et al. | 354/23 D |
| 4,117,499 | 9/1978 | Strauss | 354/23 D |
| 4,117,500 | 9/1978 | Kondo | 354/23 D |

Primary Examiner—L. T. Hix
Assistant Examiner—William B. Perkey
Attorney, Agent, or Firm—Craig and Antonelli

[57] ABSTRACT

A camera in which the automatic exposure control is conducted on the basis of measured light information obtained in accordance with the illumination of an object to be photographed. In the camera, a type of exposure control information that is predetermined irrespective of measured light information is supplied as first exposure control information into an exposure control circuit including an analog to digital converter. Subsequently, measured light information obtained through the operation of a shutter release of the camera is supplied thereinto as second exposure control information.

21 Claims, 6 Drawing Figures

CAMERA HAVING AN AUTOMATIC EXPOSURE CONTROL MEANS

BACKGROUND OF THE INVENTION

The present invention relates to a camera having an automatic exposure control means and, more particularly, to a method of supplying exposure control information into an automatic exposure control means.

Various types of means for electrically controlling the operation of electronic devices on the basis of various kinds of information supplied thereto in the form of electric signals have been proposed in recent years.

When the input signal is an analog one, it is usually converted into a digital one by using an analog to digital converter (which will be hereinafter referred to as A-D converter) so as to stabilize the input signal and effect the transmission thereof at a high accuracy.

It has been proposed to apply this method to cameras. In such an application, the method has the steps of: introducing thereinto various kinds of exposure control information, such as an aperture value, shutter speed, ASA sensitivity (sensitivity of film), and opened aperture value as analog signals based on changes in voltage; converting the signals into digital ones in the manner as mentioned above; and processing the digital signals in a control circuit including an exposure control arithmetic means. Since the capacity of the power source of the camera is limited, the feeding of the electric power to an automatic exposure control means and to circuits for processing signals or receiving and computing exposure control information is conducted when the shutter release for causing a shutter action for photographing is operated, in order to avoid the consumption of electric power of the power source while the camera is not in use.

It is therefore necessary that the processing of signals such as inputting and computing of the above-mentioned information is conducted in quite a short period of time which starts with the start of operation of the shutter release and ends with the start of operation of the shutter.

In a conventional camera, the conversions of signals are carried out by different A-D converters for different types of exposure control information, to assure the accuracy of the information. However, in such a method, a corresponding number of A-D corresponding converters to the number of types of exposure control informations are required. This causes the exposure control circuit to be complicated and brings about an increase in manufacturing cost.

A method has been proposed in which the set values of the photographing information are input in the form of codes, but this method is disadvantageous in that it requires an increased number of pins in an integrated circuit (IC) of the automatic control means, which also causes an increase in manufacturing cost.

SUMMARY OF THE INVENTION

It is therefore an object of the present invention is to provide an automatic exposure control means for cameras, which has simplified circuits and which permits inputting of exposure control information at a high accuracy.

According to the present invention, various types of exposure control information are introduced in an order into a commonly used counter and a commonly used A-D converter. In the case of a shutter speed-preferential camera, predetermined information, such as a shutter speed, is initially fed in as first exposure control information, and other information which is varied depending upon the external conditions, e.g. measured light information, is thereafter fed in as second exposure control information, for the following reasons. The external information, such as measured light information fed in as second exposure control information is accompanied by a variation in the quantity of electricity, so that the information cannot be set in a short period of time to accurately feed the same. In addition, it is desirable to determine such external information somewhere around the starting time of the shutter action.

Owing to the above-described construction, the present invention permits a simplification of the exposure control circuit, without causing a decrease in accuracy for any types of exposure control information, with a reduction in the number of counters and A-D converter. This miniaturizes the cameras, and reduces the manufacturing cost.

The above and other objects, as well as other advantageous features of the invention, will become apparent from the following description of the preferred embodiments taken in conjunction with the accompanying drawings.

DESCRIPTION OF THE PREFERRED EMBODIMENTS

Figure 1:
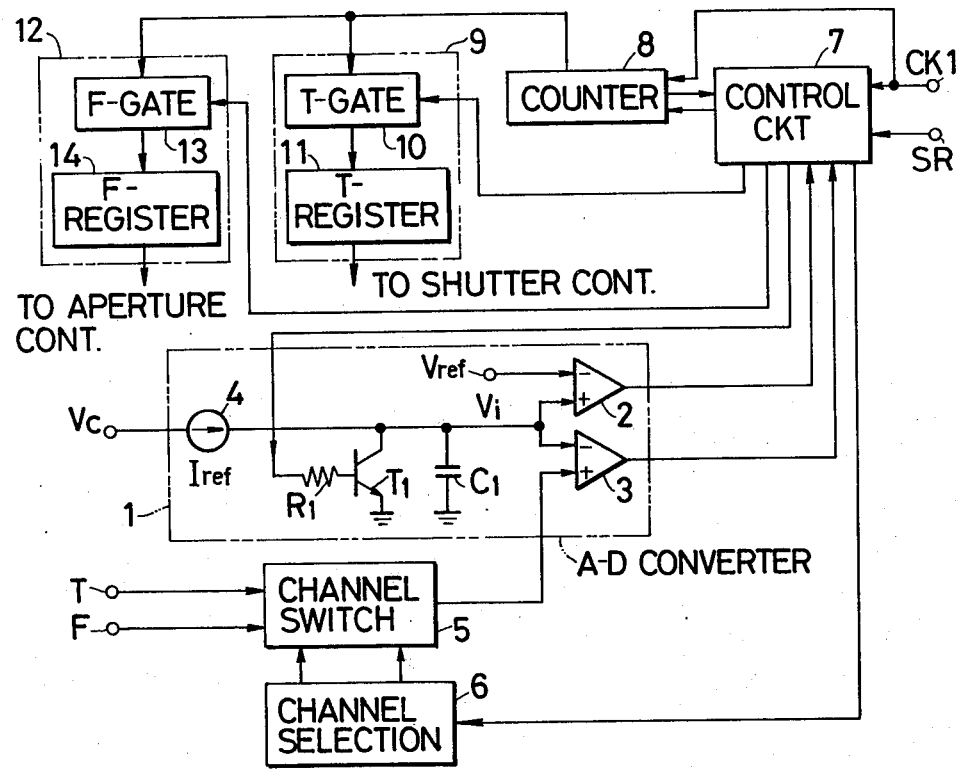
FIG. 1 is a basic schematic block diagram of the exposure control means according to the present invention.

FIG. 1 is a schematic block diagram of the exposure control system for cameras according to the present invention.

Referring to the drawing, reference symbol T denotes an input terminal for at least one type of information out of a group of shutter speed and, ASA sensitivity, and a full-open iris value, which is determined as the first exposure control information in advance to the photographing, for a single-lens reflex camera having a shutter speed-preferential automatic exposure control means. Reference symbol F denotes an input terminal for a second type of exposure control information, such as an aperture value determined by an automatic exposure control means before the shutter releasing operation has been started. These terminals T and F are connected to a 2-channel switch 5 adapted to determine the order in accordance with which signals applied to the terminals T and F are delivered to an A-D converter 1. The 2-channel switch 5 is operated by a channel selection circuit 6 which is actuated by signals from a control circuit 7. The A-D converter 1 consists of a constant current terminal Iref, one end of which is connected to a constant voltage power source Vc, a capacitor $C_1$ which is grounded at its one side and connected to the terminal Iref at the other side, a transistor $T_1$ for controlling the charging and discharging time of the capacitor $C_1$, a resistor $R_1$ connected to the base terminal of the transistor $T_1$, a comparator 2 having an inverting input terminal $\ominus$ into which a constant voltage Vref is supplied and a non-inverting input terminal $\oplus$ into which the terminal voltage of the capacitor $C_1$ is supplied, and a comparator 3 having an inverting input terminal $\ominus$ into which the terminal voltage of the capacitor $C_1$ is supplied and a non-inverting input terminal $\oplus$ into which the information applied to the terminal T or F, via the 2-channel switch 5 is supplied.

A high level signal referred to as "1" is supplied from the comparators 2 and 3 into the control circuit 7 when the input voltages at terminals $\ominus$ are smaller than the input voltages at terminals $\oplus$. A low level signal "0" is supplied therefrom into the control circuit 7 when the input voltages at terminals $\ominus$ are greater than the input voltages at terminals $\oplus$.

Reference symbol SR denotes a resetting signal for resetting the control circuit 7 to its initial state, and CK1 denotes a clock pulse supplied into the control circuit 7 and a counter 8. The counter 8 is a means for counting the number of clock pulses upon receipt of a control signal from the control circuit 7 and sending the counted information to a T gate 10 or an F gate 13. The T gate 10 and F gate 13 are means for supplying the counted pulse information from the counter 8 into a T register 11 or an F register 14, or blocking the entry of such information into the same. The T register 11 and the F register 14 are means for temporarily memorizing the information from the counter 8 and thereafter supplying the information into control circuits of a shutter mechanism and an aperture mechanism, respectively, at a proper timing.

Figure 2:
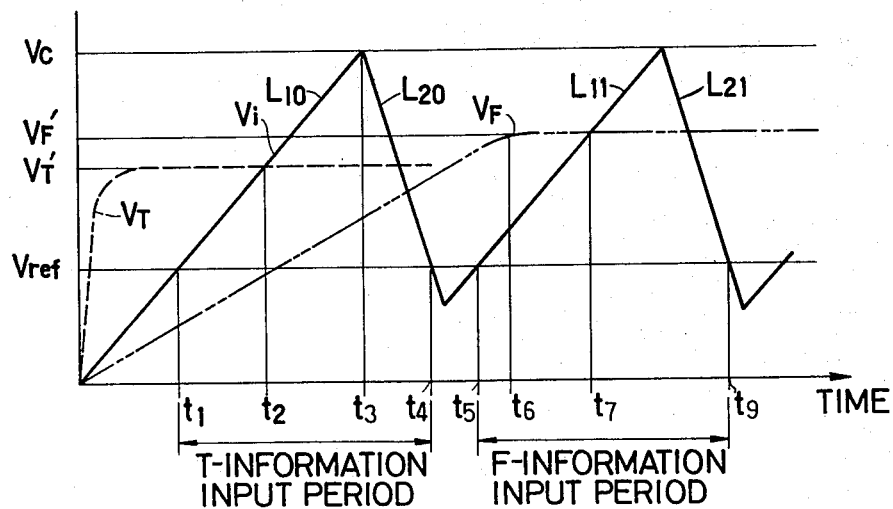
FIG. 2 is a composite diagram of the wave forms of signals generated at various points in the exposure control means as shown in FIG. 1.

FIG. 2 shows the wave forms of voltage signals supplied into the comparators 2, 3. In FIG. 2, the ordinate represents voltage, while the abscissa represents time. Reference symbols $L_{10}$, $L_{11}$ denote the wave forms of the voltage of a capacitor $C_1$ obtained during charging; $L_{20}$, $L_{21}$ the wave forms of the voltage thereof obtained during discharge; Vc a maximum charging voltage of the capacitor $C_1$ of the A-D converter 1; VT, VF the wave forms of signals supplied from the T terminal and F terminal, respectively; and constant values of voltages VT', VF' correspond to the correct exposure control information.

Now, the operation of an embodiment of the present invention will be described.

As electric power is supplied into the whole circuit in accordance with the action of a shutter release (not shown), the channel selection switch 6 is energized to turn on a switch which is to be connected to the T input terminal and which is contained in the 2-channel switch 5 receiving the information applied to the input terminal T. Consequently, a first exposure control information is supplied into the input terminal $\oplus$ of the comparator 3.

The capacitor $C_1$ is charged through the constant current terminal Iref to begin to produce a linear voltage wave form $L_{10}$. A reference constant voltage Vref is applied to the terminal $\ominus$ of the comparator 2. In the early stage of power supplying, the voltage of the capacitor C is low and the voltage at the terminal $\oplus$ of the comparator 2 is lower than that at the terminal $\ominus$ thereof. Therefore, an output "0" is delivered from the comparator 2 into the control circuit 7. The voltage of the capacitor $C_1$ is applied also to the terminal $\ominus$ of the comparator 3. At this time, however, the input voltage at the terminal $\ominus$ is still low and the voltage at the terminal $\oplus$ is high, so that an output "1" is delivered from the comparator 3 into the control circuit 7.

The voltage of the capacitor $C_1$ thereafter continues to be increased and the magnitudes of the input constant voltage Vref of the comparator 2 and charging voltage Vi of the capacitor $C_1$ are reversed at the time $t_1$ so that an output "1" is delivered to the control circuit 7, so as to be turned into a signal for starting the operation of the counter 8. The counter 8 starts to count the input pulses at an instant $t_1$. At another instant $t_2$, the charging voltage Vi of the capacitor $C_1$ exceeds an input voltage VT' (at this time, the T information voltage VT has already reached the constant voltage VT' corresponding to the given exposure information) at the terminal $\oplus$ of the comparator 3, so that an output "0" is supplied from the comparator 3 and the T gate 10 is opened by the control circuit 7. At this time, counter information corresponding to the first exposure information is transferred to the T register 11, so as to be stored in the latter. Since the F gate 13 remains closed, the counter information therein is not supplied into the F register 14.

When the counter 8 has counted an arbitrarily determined number (or all numbers) of pulses, the control circuit 7 causes the capacitor $C_1$ to discharge at an instant $t_3$ to turn the transistor $T_1$ on. Consequently, the capacitor $C_1$ rapidly discharges as will be seen from the wave form $L_{20}$ as shown in FIG. 2.

When the voltage of the capacitor $C_1$ becomes lower than the reference voltage Vref, the output of the comparator 2 becomes "0". This signal causes the control circuit 7 to send a signal to the channel selection circuit 6 so that an input switch, which is contained in the 2-channel switch 5 and which is connected to the input terminal F, is turned on, while the input switch connected to the terminal T is turned off. At the same time, the control circuit 7 generates a signal for turning off the discharge transistor $T_1$, thereby to start the charging of capacitor $C_1$ again.

The information voltage VF (second exposure control information) at the input terminal F, based on a measured light value including a response delay factor, has substantially reached the constant voltage VF', during the spare time for inputting of T information (the time up to the instant $t_6$). Therefore, the second exposure control information applied to the input terminal F advances in the same manner as the first exposure control information applied to the input terminal T, so as to be memorized by the F register 13.

As the discharge transistor $T_1$ is turned on by the control circuit 7 after the second control information has thus been memorized by the F register 13 in the same manner as the first exposure control information, the terminal voltage of the capacitor $C_1$ is lowered. When the terminal voltage of the capacitor $C_1$ becomes lower than the reference constant voltage Vref, the output of the comparator 2 becomes "0" and the switch to be connected to the input terminal T is turned on again by the 2-channel switch 5. Consequently, the circuit is returned to its initial state and the same action is repeated.

The first exposure control information (T terminal information) and the second exposure control information (F terminal information) are alternately converted into digital information to be supplied into digital information to be supplied into the T register 10 and F register 13. The above operation is repeated until the front screen of shutter of the camera has started running. However, a signal for starting exposing action is not generated in the control circuit 7 until a minimum time necessary for once inputting signals to the T register 10 and F register 13, respectively, has elapsed.

Figure 3:
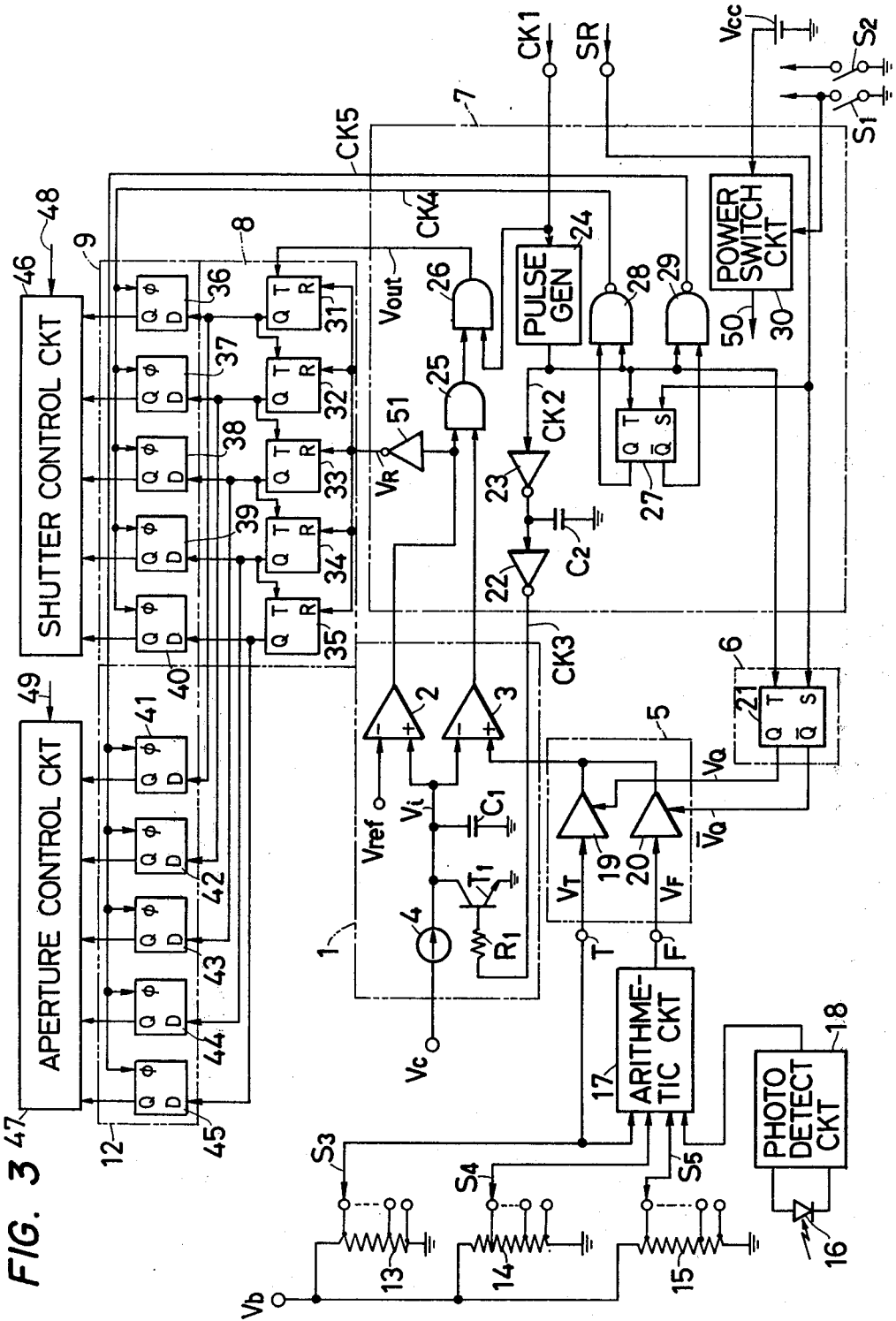
FIG. 3 is a detailed block diagram of the exposure control means as shown in FIG. 1.

The invention will now be described in more detail with reference to a specific diagram of the circuit as shown in FIG. 3.

Referring to the drawing, reference numeral 13 denotes a resistor for determining shutter speed. This resistor 13 is connected at its one end to a power source Vb, so that different voltages are obtained at the terminals of this resistor corresponding to different shutter speeds. The position of a slide contact $S_3$ is manually fixed in accordance with the desired shutter speed. A resistor 14 is for determining the F number of the lens while the aperture is opened, with a voltage in accordance with each F number obtained at each of its output terminals. Reference numeral 16 denotes a photodiode for converting the quantity of light of an object to be photographed into an electric signal. The electric signal from the photodiode 16 is converted into a voltage in accordance with the quantity of light (illumination) of the object to be photographed, by a photo-detection circuit 18. Reference numeral 17 denotes an arithmetic circuit adapted for receiving a shutter speed signal determined by the resistor 13, an F number signal determined by the resistor 14, an ASA value signal determined by the resistor 15, and a light measuring signal from the circuit 18, and for subjecting these signals to an analog computation to generate an analog output signal representative of an optimum aperture value for the purpose of obtaining a suitable exposure amount in accordance with the photographic characteristic curve.

Figure 5:
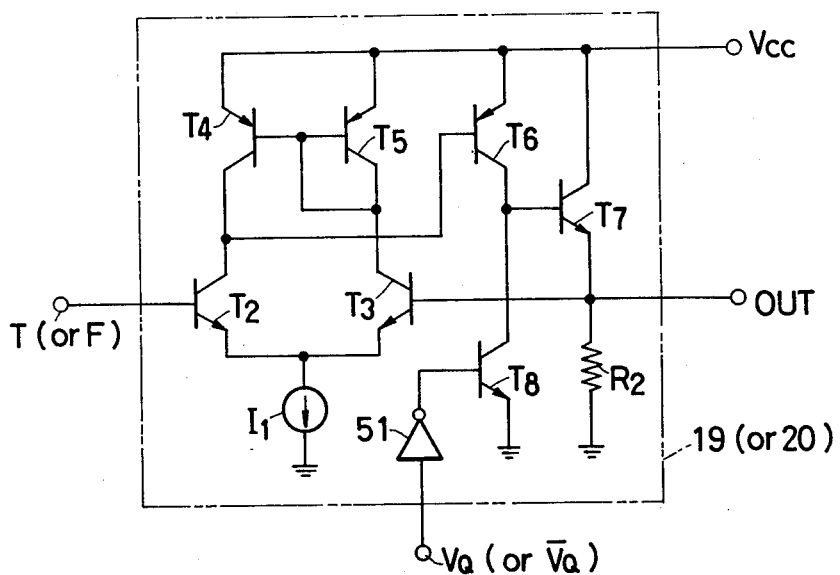
FIG. 5 is a diagram of an example of a circuit which can be used for the channel switch for the exposure control means as shown in FIG. 3.

The 2-channel switch 5 consists of two switch circuits 19, 20. A practical arrangement of these switches is shown, by way of example, in FIG. 5.

Referring to the drawing, reference symbols $T_2$ and $T_3$ denote transistors differentially connected to a constant current source $I_1$; $T_4$ and $T_5$ load transistors for loading the transistors $T_2$, $T_3$; and $T_6$, $T_7$, $R_2$ transistors and a resistor, respectively, constituting an output circuit. Reference symbol $T_8$ denotes a switching transistor connected between the base of the transistor $T_7$ and the ground, and is adapted to be turned on and off by a control signal VQ ($\overline{VQ}$) applied thereto through an inverter 51, thereby to control the transmission of a signal at the input terminal T (F) to an output terminal OUT.

Referring to FIG. 3 again, the channel selection circuit 6 consists of a negative edge trigger type flip-flop which is set by a control signal SR, adapted to deliver control voltages VQ, $\overline{VQ}$ of different phases to the channel selection circuit 5. The analog to digital converter 1 is constructed in the same manner as that as shown in FIG. 1.

Figure 6:
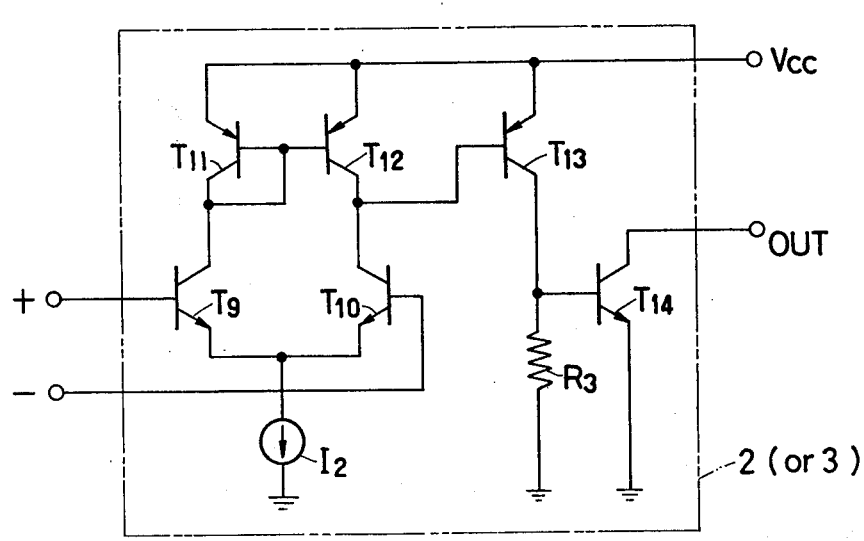
FIG. 6 is a diagram of an example of a circuit which can be used for the comparator for the exposure control means as shown in FIG. 3.

The constructions of a pair of comparators 2, 3 are concretely shown in FIG. 6.

Referring to the drawing, reference numerals $T_9$ and $T_{10}$ denote a pair of transistors differentially connected to a constant current source $I_2$; $T_{11}$, $T_{12}$ transistors which constitute a current mirror; and $T_{13}$, $T_{14}$, $R_3$ transistors and a resistor, respectively, which constitute an output circuit.

Referring to FIG. 3 again, the counter 8 consists on trigger type flip-flops 31–35. Each of these flip-flops has a trigger input terminal T, a resetting input terminal R, and an output terminal Q, and is reset with a "1" level signal applied to the terminal Q. The contents of the flip-flops (signals at the output terminals Q) are reversed with a signal applied to the trigger input terminal T. Reference numeral 9 denotes a memory circuit for memorizing first exposure control information (e.g. shutter speed information) and it has the same functions as the T gate 10 and T register 11. This memory circuit 9 consists of delayed flip-flops 36–40. Each of these flip-flops has an input terminal D, an output terminal Q, and a control input terminal $\phi$. Only when a control signal is applied to the control input terminal $\phi$, the signal is admitted to the input terminal D so that it is memorized and retained. Reference numeral 12 denotes a memory circuit for memorizing a second exposure control information (aperture value) and it consists of delayed flip-flops 41–45 just as the memory circuit 9. The information memorized by the flip-flops 36–40 of the memory circuit 9 is supplied into a shutter control circuit 46 in which the information received is converted into control time by a time conversion circuit (not shown) included therein. This control time signal serves to control a magnet by which the shutter blind is held, to determine the shutter speed.

In the meantime, the information memorized by the flip-flops of the memory circuit 12 is supplied into an aperture control circuit 47 in which it is converted into exposure time. In order that the aperture value may be adjusted with the resulting exposure time signal, an electric current is supplied into a solenoid for mechanically controlling the aperture of the camera. These control circuits 46, 47 are turned into operation by control signals delivered through lines 48, 49.

The control circuit 7 includes a pulse generator 24 for forming control pulse CK2 upon receipt of clock pulse CK1, and a delay circuit consisting of two inverters 22, 23 and a capacitor $C_2$ for delaying the control pulse CK2. A control pulse CK3 delayed by the delay circuit consisting of the inverters 22, 23 and capacitor $C_2$ is applied to the switching transistor $T_1$ through the resistor $R_1$. The control circuit further includes an AND gate 25 for deriving outputs from the comparators 2, 3, and an AND gate 26 for receiving an output signal from the AND gate 25 and the clock pulse CK1. Owing to the actions of these AND gates 25, 26, the clock pulse CK1 is supplied as a signal voltage V out into the first flip-flop 31 via the AND gate 26 only while the analog voltage (VT or VF) to be applied to the non-inverting terminal $\oplus$ of the comparator 3 is higher than the reference voltage Vref to be applied to the comparator 2 and lower than the terminal voltage Vi of capacitor $C_1$ to be applied to the comparators 2, 3. The output from the comparator 2 is applied to the resetting terminals R of the flip-flops 31–35 through an inverter 51.

The control circuit 7 still further includes a circuit which consists of a trigger type flip-flop 27 having the same characteristics as the flip-flop 21, for generating control pulses CK4, CK5 by which the register 9, 12 are controlled; and of NAND gates 28, 29. The control circuit 7 further includes a power switch circuit 30 for turning on and off the power supply to the above-mentioned circuits 1-45, 51. The input of the circuit 30 is connected to the battery Vcc and the output line 50 is connected to each circuit. The power switch circuit 30 is controlled by the release switch $S_1$ connected to a release button. Namely, when the release button is lightly depressed, the switch $S_1$ is turned on to allow the circuit 30 to be energized so that the voltage of the battery Vcc is supplied to each circuit. When the release button is further depressed strongly, another release switch $S_2$ connected thereto is also turned on to send a control signal to another sequence control circuit (not shown).

Figure 4:
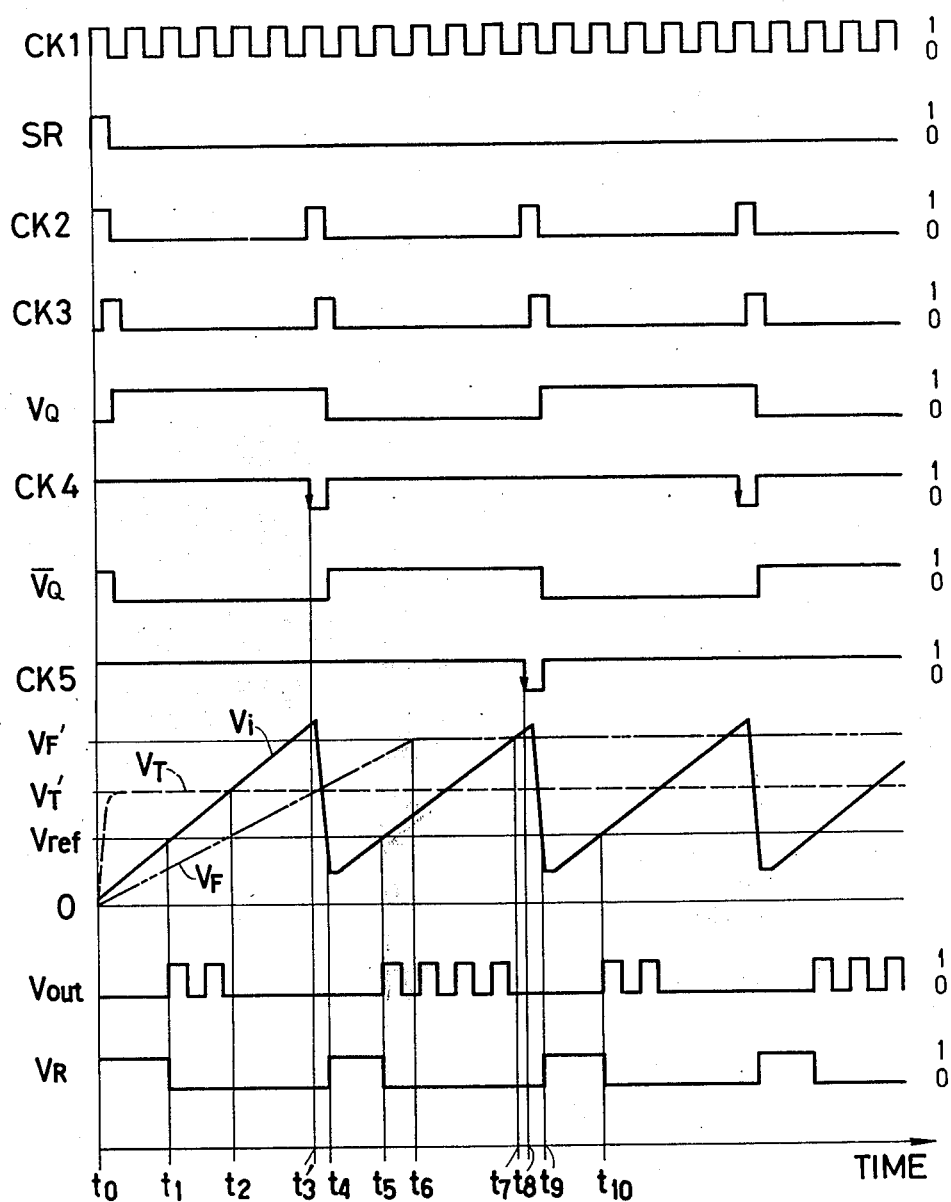
FIG. 4 is a composite diagram of the wave forms of signals generated at various points in the exposure control means as shown in FIG. 3.

The operation of the above-mentioned exposure control means will be described with reference to the voltage wave forms as shown in FIG. 4 with respect to the various points in the diagram as shown in FIG. 3.

When the release button is lightly depressed to close the switch $S_1$ at an instant $t_0$, an electric current is supplied into the whole circuit and a resetting signal SR is sent thereto from another sequence control circuit. The flip-flop 21 is set by the control signal SR so as to generate a "1" level output voltage VQ at the output terminal Q and a "0" level output voltage $\overline{V}Q$ (zero volt) at the output terminal $\overline{Q}$. Then, the channel switch 19 only is actuated to transmit a shutter speed analog voltage VT (first exposure control information) at the terminal T to the comparator 3. An analog voltage VT representative of shutter speed applied at this time to the input terminal of the channel switch 19 is the voltage generated by the resistor 13, directly applied thereto without being passed through another circuit. Therefore, the analog voltage VT has a predetermined level VT' which is stabilized substantially at the same time that the power switch $S_1$ is closed at the instant $t_0$. Since the input circuit consisting of the resistor 13 connected to the input terminal T does not include a circuit element having a large time constant, a voltage having a predetermined level can be delivered to the terminal T substantially at the same time that the power switch $S_1$ is closed.

The input voltage VT applied to the terminal ⊕ of the comparator 3 is compared with the terminal voltage Vi of the capacitor $C_1$. As a result, the clock pulse CK1 is transmitted as an output voltage Vout to the first flip-flop 31 which constitutes a counter 8, through the AND gate 26 during a period of time (starting at an instant $t_1$ and ending at the instant $t_2$) in which the terminal voltage Vi of the capacitor $C_1$ is higher than the reference voltage Vref and lower than the stabilized level VT' of the input voltage VT. This allows the counter 8 to count the pulse number of the clock pulse signal from the instant $t_1$ to the instant $t_2$, so that the analog signal applied to the terminal T is converted into a digital signal.

The shutter speed information (VT) introduced into the counter 8 is memorized by the flip-flops 36–40 constituting the register 9 with the control signal CK4 which is sent at the instant $t_3'$ to the input terminals φ of these flip-flops 36–40, and this memorized information is utilized for controlliing the shutter.

In the meantime, an aperture value voltage VF to be applied to the input terminal F of the channel switch 20 as second exposure control information is determined in accordance with the quantity of light from the object to be photographed. This voltage VF is generated by the photodetection circuit 18 and arithmetic circuit 17 which have been turned into operation at the time that the power switch $S_1$ is closed at the instant $t_0$. Since these circuits 18, 17 have comparatively large equivalent time constants, the actions thereof are unstable during a comparatively long transition period after the power switch has been closed. FIG. 4 shows that the aperture value voltage VF is in an unstable transition state from the instant $t_0$ to the instant $t_6$ at which it reaches a stabilized level VF'.

According to the present invention, the exposure control information generated by such circuits having a response delay element is treated by the analog to digital converter as second exposure control information during the second period of time and memorized by the memory circuit 12.

In the second period of time during which the output voltage VQ of the flip-flop 21 in the channel selection circuit 6 is inverted to a "0" level and during which the output $\overline{V}Q$ is inverted to a "1" level, the channel switch 19 is turned off, whereas the channel switch 20 is turned on so that the aperture value signal VF at the terminal F is sent to the comparator 3.

The aperture value voltage applied to the comparator 3 is transmitted as a clock pulse signal Vout generated between the time $t_5$ and time $t_7$ to the first flip-flop 31 of the counter 8 which was already reset with a signal VR at the time $t_5$, and the voltage is then memorized by the R-register 12 with a control signal CK5 generated at the time $t_5$.

According to the present invention which has been clearly described above, the first exposure control information which has no relation to the measured light information is memorized by the memory circuit at the same time that the power switch is closed, and the second exposure control information which is related to the measured light information is then memorized by the memory circuit during the second period of time. Consequently, a second exposure control information in a stable condition can be produced during the feeding of first exposure control information. This allows exposure control information to be fed efficiently in a short period of time. Then, even when the operation of the shutter for photographing (the operation of the release switch $S_2$) is started immediately after the action of the first release switch $S_1$ for turning on the power source has been completed, an accurate exposure amount in accordance with the external conditions at the time of photographing can be obtained.

Furthermore, the present invention permits using the analog to digital converter and counter or arithmetic means for many types of input exposure control information. Some other kinds of control circuits may also be used for many input exposure control circuits. This allows the number of parts of an exposure control means for a camera to be reduced. Consequently, a miniaturized semiconductor integrated circuit (IC) can be provided. At the same time, exposure control information of a high accuracy can be fed in because it is unnecessary in the present invention to consider the fluctuation of circuits for treating some kinds of input exposure control information. For example, according to the present invention, one analog to digital converter is used commonly to treat the signals of the information on shutter speed and aperture value. In other words, two types exposure control informations can be treated without taking into consideration the fluctuation in the characteristics of the capacitor $C_1$ and switching transistor $T_1$ for producing a ramp or sawtooth wave form.

In the above paragraphs, a single-lens reflex camera provided with a so-called a shutter speed-preferential automatic exposure control means for preferentially determining the shutter speed irrespective of the measured light information is described. However, it is clear that the automatic exposure control means according to the present invention is effectively used for any type of cameras having an automatic exposure controller, irespective of whether it is a shutter speed-preferential one or an aperture-preferential one.

We claim:

1. An automatic exposure control circuit for a camera for automatically controlling the exposure value of a photographic film in accordance with plural types of exposure control information comprising:

a first signal supply means for supplying a first analog signal corresponding to a first type of exposure control information irrespective of the illumination of an object to be photographed, said first signal supply means being energized by a power source at the same time that a shutter release for said camera is operated;

a second signal supply means for supplying a second analog signal corresponding to a second type of exposure control information in accordance with said illumination of said object to be photographed, said second signal supply means being energized simultaneously with said first signal supply means by said power source;

an analog to digital converter for converting an analog signal into a digital signal;

a signal selection means coupled to said first and second signal supply means and said analog to digital converter for transmitting said first analog signal to said analog to digital converter during a first predetermined period immediately after said energizing of said first and second signal supply means, and transmitting said second analog signal to said analog to digital converter during a second predetermined period succeeding said first predetermined period; and a control circuit means for controlling said exposure value with first and second digital output signals of said analog to digital converter respectively corresponding to said first and second analog signals which are produced through said analog to digital converter.

2. An automatic exposure control circuit according to claim 1, wherein said second signal supply means has a delay time in operation response to said energizing of said power source longer than that of said first signal supply means.

3. An automatic exposure control circuit according to claim 2, wherein said first signal supply means comprises a potentiometer for supplying said first analog signal in accordance with said first exposure control information; and said second signal supply means comprises a light detecting means for detecting said illumination of the object to be photographed and an arithmetic circuit which receives an output signal of said light detecting means and produces said second analog signal.

4. An automatic exposure control circuit according to claims 1, 2 or 3, wherein said first type of exposure control information represents the shutter speed of the camera, and said second type of exposure control information represents the aperture value of the camera.

5. An automatic exposure control circuit according to claim 3, wherein said control circuit means includes first and second register means for respectively storing said first and second digital output signals.

6. A camera having an automatic exposure control means for electronically controlling the exposure amount of a film in accordance with the illumination of an object to be photographed, said automatic exposure control means comprising:

a power switching circuit connected to a power source to form a power supply path therethrough in response to the depression of a release button for a photographing operation;

a first signal forming circuit for generating a first analog electric signal in accordance with a first type of exposure control information determined irrespective of the illumination of said object to be photographed, said first signal forming circuit being energized through said power supply path of the power switching circuit by said power source;

a second signal forming circuit for generating a second analog electric signal in accordance with a second type of exposure control information determined in accordance with the illumination of said object to be photographed, said second signal forming circuit being energized through said power supply path of the power switching circuit by said power source;

an analog to digital converter for converting an analog electric signal into a digital electric signal;

a selection circuit coupled to said first and second signal forming circuits and said analog to digital converter for feeding said first analog electric signal into said analog to digital converter during a first predetermined period of time immediately after forming said power supply path of the power switching circuit by the operation of said release button so as to energize said first and second signal forming circuits, and feeding said second analog electric signal into said analog to digital converter during a second predetermined period of time succeeding said first predetermined periof of time; and a control circuit for controlling said exposure amount with digital output electric signals from said analog to digital converter respectively corresponding to said first and second analog electric signals which are converted through said analog to digital converter.

7. A camera according to claim 6, wherein said control circuit includes memory circuit means for respectively memorizing said digital output electric signals corresponding to said first and second analog electric signals.

8. A camera according to claim 6, wherein said second signal forming circuit has a delay time in its operating response after being energized by said power switching circuit in response to the operation of the release button, said delay time being longer than a delay time in the operating response to said first signal forming circuit.

9. A camera according to claim 8, wherein said first predetermined period of time is shorter than said delay time of the second signal forming circuit.

10. A camera according to claim 7, wherein said second signal forming circuit has a delay time longer than that of said first signal forming circuit in the operation response after being energized by said operation of the shutter release button.

11. A camera according to claim 6, wherein said first type of exposure control information represents the shutter speed of the camera, and said second type of exposure control information represents the aperture value of the camera.

12. A camera according to claims 1 or 11, wherein said second signal source consists of a light detecting means for detecting the illumination of said object to be photographed, and an arithmetic circuit which receives an output electric signal from said light detecting means to produce said second analog electric signal.

13. A camera according to claim 12, wherein said arithmetic circuit receives an electric signal corresponding to said first type of exposure control information and an electric signal corresponding to a third type of exposure control information with said electric output signal from said light detecting means to thereby produce said second analog electric signal.

14. A camera according to claim 13, wherein said third type of exposure control information represents the sensitivity (ASA value) of the film loaded in the camera.

15. An automatic exposure control circuit according to claims 1 or 6, wherein the control circuit includes a counter and first and second register means for respectively storing the first and second digital output signals wherein the control circuit controls the counter to determine the time period for the respective storage of the first and second digital output signals in the first and second register means by storing the first digital signal during a first storage time period within the first predetermined period and storing the second digital signal during a second storage time period within the second predetermined period.

16. An automatic exposure control circuit according to claim 15, wherein the analog to digital converter further comprises a capacitor and means for charging and discharging the capacitor coupled to the control circuit, wherein said means for charging and discharging said capacitor is controlled by said control circuit.

17. An automatic exposure control circuit according to claim 16, wherein the analog to digital converter further comprises comparator means for starting the counter to begin the first storage time period when the capacitor charge exceeds a predetermined reference voltage.

18. An automatic exposure control circuit according to claim 17, wherein the control circuit discharges the capacitor after the counter has reached a predetermined count following the beginning of the first storage time period, and further wherein the control circuit switches the selection circuit to transmit the second analog signal to the analog to digital converter after the voltage of the discharging capacitor has dropped below the predetermined reference voltage thereby ending the first storage time period.

19. An automatic exposure control circuit according to claim 18, wherein the control circuit begins charging the capacitor again after the end of the first storage period and wherein said comparator means starts the counter to begin the second storage time period when the capacitor charge again exceeds said predetermined reference voltage.

20. An automatic exposure control circuit according to claim 19, wherein the control circuit discharges the capacitor after the counter has reached a predetermined count following the beginning of the second storage time period, and further wherein the control circuit switches the selection circuit back to its initial state of transmitting the first analog signal to the analog to digital converter after the voltage of the discharging capacitor has dropped below the predetermined reference voltage thereby ending the second storage time period.

21. In a camera having a digital exposure control circuit means, for controlling the exposure value in accordance with at least two exposure parameters, which includes first and second analog signal forming circuits for forming first and second analog signals respectively corresponding to said exposure parameters, said second analog signal forming circuit including light measuring means for measuring the intensity of light incident upon an object to be photographed and producing an illumination intensity signal; an analog to digital converter; and an electronic changeover switch means coupled to the first and second analog signal forming circuits and the analog to digital converter for alternatively transmitting said first and second analog signals to said analog to digital converter, the improvement wherein said exposure control circuit means is energized from a battery through a power switching circuit which forms a power supply path in response to the operation of a shutter release button of the camera for photographing said object, and wherein said electronic changeover switch means is adapted so as to transmit said first analog signal into said analog to digital converter during a first predetermined period immediately after being energized from said battery through said power supply path by the operation of said shutter release button, and so as to transmit said second analog signal into said analog to digital converter during a second predetermined period succeeding said first predetermined period.

* * * * *